(12) United States Patent
Beaulieu et al.

(10) Patent No.: US 12,000,749 B2
(45) Date of Patent: Jun. 4, 2024

(54) FLEXIBLE TACTILE SENSORS FOR MEASURING CONTACT SURFACE NORMAL FORCE USING INDUCTIVE COUPLING

(71) Applicant: TOYOTA RESEARCH INSTITUTE, INC., Los Altos, CA (US)

(72) Inventors: Andrew M. Beaulieu, Somerville, MA (US); Kristopher Lopez, Staten Island, NY (US)

(73) Assignee: Toyota Research Institute, Inc., Los Altos, CA (US)

(*) Notice: Subject to any disclaimer, the term of this patent is extended or adjusted under 35 U.S.C. 154(b) by 272 days.

(21) Appl. No.: 17/344,354

(22) Filed: Jun. 10, 2021

(65) Prior Publication Data

US 2022/0397472 A1 Dec. 15, 2022

(51) Int. Cl.
  *G01L 5/164* (2020.01)
  *B25J 13/08* (2006.01)
  *G01L 5/22* (2006.01)

(52) U.S. Cl.
  CPC .............. *G01L 5/164* (2013.01); *G01L 5/228* (2013.01); *B25J 13/084* (2013.01)

(58) Field of Classification Search
  CPC ......... G01L 5/164; G01L 5/228; B25J 13/084
  See application file for complete search history.

(56) References Cited

U.S. PATENT DOCUMENTS

| | | | |
|---|---|---|---|
| 3,711,766 A * | 1/1973 | Dahm | G01L 5/045 324/209 |
| 5,905,430 A | 5/1999 | Yoshino et al. | |
| 7,548,489 B1 * | 6/2009 | Clark | G01V 1/02 367/142 |
| 9,700,258 B2 * | 7/2017 | Jiang | G01L 1/127 |
| 9,983,757 B2 * | 5/2018 | Porter | G06F 3/046 |
| 10,359,324 B2 * | 7/2019 | Sipilä | H01F 27/2804 |
| 10,549,428 B2 | 2/2020 | Alspach et al. | |
| 2019/0178736 A1 * | 6/2019 | Shimizu | G01L 1/127 |

(Continued)

FOREIGN PATENT DOCUMENTS

| | | | | |
|---|---|---|---|---|
| CN | 102741783 B | * | 5/2016 | ............ G06F 3/016 |
| CN | 113383218 A | * | 9/2021 | ............ B25J 13/084 |
| DE | 4333419 A1 | * | 4/1994 | ............ G01B 7/105 |

(Continued)

OTHER PUBLICATIONS

Oberhauser, Chris, LDC Device Selection Guide, Texas Instrument Application Report, Nov. 2019.

(Continued)

*Primary Examiner* — Octavia Davis Hollington
(74) *Attorney, Agent, or Firm* — Dinsmore & Shohl LLP (57) ABSTRACT

A flexible tactile sensor includes a conductive target positioned in a first plane, at least three coils forming an array within a second plane, the second plane spaced apart from the first plane, a pliable material coupling the conductive target to the at least three coils, and an electronic device electrically coupled to each of the at least three coils, the electronic device configured to induce an AC signal within each of the at least three coils and measure a change in inductance in the at least three coils in response to movement of the conductive target.

20 Claims, 10 Drawing Sheets

(56) References Cited

U.S. PATENT DOCUMENTS

2023/0103759 A1\* 4/2023 Beaulieu .................. G01L 1/14
                                                                                73/862.541

FOREIGN PATENT DOCUMENTS

| DE | 102018131925 A1 | | 6/2019 |
| --- | --- | --- | --- |
| JP | 2002236059 A | | 8/2002 |
| JP | 2003337071 A | | 11/2003 |
| JP | 2011185858 A | \* | 9/2011 |
| JP | 2011185858 A | | 9/2011 |
| KR | 20140135708 A | \* | 11/2014 |
| WO | 2020163547 | | 8/2020 |

OTHER PUBLICATIONS

Oberhauser, Chris, LDC Target Design, Texas Instrument Application Report, May 2017.

\* cited by examiner

FLEXIBLE TACTILE SENSORS FOR MEASURING CONTACT SURFACE NORMAL FORCE USING INDUCTIVE COUPLING

TECHNICAL FIELD

The present specification generally relates to flexible tactile sensors. More specifically, the present concept relates to flexible tactile sensors for measuring contact surface normal force using inductive coupling.

BACKGROUND

Tactile sensing is implemented in human-machine interfaces so that physical actions from a human may be perceived by a machine. Additionally, tactile sensing is a critical sensory modality for robotic systems. For example, tactile sensing can provide robots with an analogous biological sense of cutaneous touch. The sense of touch includes more than the mere determination of contact with an object. Touch information includes at least the perception of contact, force, pressure, shape, texture, location, movement, temperature, and pain. For humans, touch is perceived through a variety of receptors in the skin. However, for robotic systems electrical and mechanical sensors are implemented to provide various perceptions of touch to the system. The development of tactile sensing continues to evolve as depends widely on the application of a robot. As the definition for tactile sensing for robotic systems evolves the need for improved tactile sensors for applications such as obtaining and maintaining grasp of objects subject to manipulation are needed. Such applications require tactile sensors capable of perceiving contact, force, and pressure within a specific region as well as providing touch information to determine the application of at least normal forces, slip forces, and shear forces. Some tactile sensors accomplish these tasks using imaging sensors that track motion of predetermined markers on a contact surface. However, tactile sensors are based on vision systems that can require analysis of large amounts of data to generate touch information. Accordingly, depending on the application of a robot less data intense tactile sensors may be desired.

SUMMARY

In one embodiment, a flexible tactile sensor includes a conductive target positioned in a first plane, at least three coils forming an array within a second plane, the second plane spaced apart from the first plane, a pliable material coupling the conductive target to the at least three coils, and an electronic device electrically coupled to each of the at least three coils, the electronic device configured to induce an AC signal within each of the at least three coils and measure a change in inductance in the at least three coils in response to movement of the conductive target.

In some embodiments, a system includes a computing device communicatively coupled to one or more flexible tactile sensors, and a flexible tactile sensor. The flexible tactile sensor includes a conductive target positioned in a first plane, at least three coils forming an array within a second plane, the second plane spaced apart from the first plane, a pliable material coupling the conductive target to the at least three coils, and an electronic device electrically coupled to each of the at least three coils, the electronic device configured to induce an AC signal within each of the at least three coils and measure a change in inductance in the at least three coils in response to movement of the conductive target. The computing device is configured to receive one or more signals from the electronic device of at least one of the one or more flexible tactile sensors, the one or more signals corresponding to the measured changes in the inductance in the at least three coils, and determine a magnitude and direction of a normal force of the conductive target.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

FIG. 4A-1 schematically depicts an illustrative top-down view of a coil arrangement positioned at a first height below a conductive target of a flexible tactile sensor according to one or more embodiments shown and described herein;

FIG. 4A-2 schematically depicts an illustrative side perspective view of the coil arrangement positioned at the first height below the conductive target of a flexible tactile sensor depicted in FIG. 4A-1 according to one or more embodiments shown and described herein;

FIG. 4B-1 schematically depicts an illustrative top-down view of a coil arrangement positioned at a second height below a conductive target of a flexible tactile sensor according to one or more embodiments shown and described herein;

FIG. 4B-2 schematically depicts an illustrative side perspective view of the coil arrangement positioned at the second height below the conductive target of a flexible tactile sensor depicted in FIG. 4B-1 according to one or more embodiments shown and described herein;

FIG. 4C-1 schematically depicts an illustrative top-down view of a coil arrangement positioned at a second height below a conductive target that has been shifted laterally according to one or more embodiments shown and described herein;

FIG. 4C-2 schematically depicts an illustrative side perspective view of the coil arrangement positioned at the second height below a conductive target that has been shifted laterally as depicted in FIG. 4C-1 according to one or more embodiments shown and described herein;

FIG. 4D-1 schematically depicts an illustrative top-down view of a coil arrangement positioned at below a conductive target that is shifted laterally and axially rotated according to one or more embodiments shown and described herein;

FIG. 4D-2 schematically depicts an illustrative side perspective view of the coil arrangement positioned at the second height below a conductive target that is shifted laterally and axially rotated as depicted in FIG. 4D-1 according to one or more embodiments shown and described herein.

DETAILED DESCRIPTION

Embodiments of the present disclosure are directed to flexible tactile sensors for measuring contact surface normal forces using inductive coupling. The flexible tactile sensors and systems described herein include a conductive target spaced apart from a plurality of induction coils configured in an array and electrically coupled to an electronic device that monitors changes in the inductance in the plurality of induction coils in response to movement of the conductive target. The conductive target and the plurality of induction coils are coupled to each other through a pliable material, which enables the conductive target to move horizontally, vertically, and combinations thereof with respect to the plurality of induction coils when in contact with an object. When contact with the object is removed, the pliable material causes the conductive target to return to an original position with respect to the plurality of coils.

The flexible tactile sensors disclosed herein may be implemented as a human-machine interface device that converts physical actions from a human into machine instructions for controlling the machine or inputting information. In other implementations, the flexible tactile sensors disclosed herein may be implemented on robotic systems to provide the sensory modality of touch to the robotic system. The flexible tactile sensors can provide touch information including contact, force, pressure, location, movement, and the like. The touch information may be analyzed to determine normal forces and/shear forces applied to the conductive target.

As described in more detail herein, the flexible tactile sensor includes a conductive target, which is larger than the plurality of induction coils, or at least overlaps with a portion of each of the plurality of induction coils are positioned beneath it.

The coupling inductance of each of the plurality of sensor coils is monitored by an electronic device and/or a controller. As force is applied to the contact target, the contact target changes position with respect to the plurality of sensor coils. The shift in position of the conductive target changes the coupling inductance in the plurality of sensor coils. For example, as the conductive target moves closer to the plurality of induction coils, eddy currents in the conductive target increase and the magnetic field of the source coil weakens. This changes the inductance of the coils, which is detectable by an electronic device such as an inductance-to-digital converter (LDC). When the inductance of the system is reduced, the resonant frequency of the coil increases. The translation of the conductive target, through known properties of the pliable material compressive and shear forces, maps to a contact force that can be determined by a computing device based on the changes in the inductance of the coils.

Robots are commonly equipped with end effectors that are configured to perform certain tasks. An end effector of a robotic arm may be configured as a human hand, or as a two-fingered gripper. However, robots do not have varying levels of touch sensitivity as do humans through the numerous nerve fibers that are engaged when skin or hair makes contact with an object. Accordingly, end effectors may include sensors such as pressure sensors, but such sensors provide limited information about the object that is in contact with the end effector. Thus, the robot may damage a target object by using too much force, applying force in the wrong direction, or dropping the object because the end effector does not have a secure grasp the object.

In robotic systems, a plurality of flexible tactile sensors may be implemented forming a surface and networked together. By integrating tactile sensing across large parts of a robot arm and other parts of the robot, a controller can be configured to sense pressure and force across the surface and identify the locations of the same. The flexible tactile sensors may also provide shear and/or slip sensing for robots, in particular, when maintaining grasp on difficult to manipulate objects.

Embodiments of the present disclosure include flexible tactile sensors and flexible tactile sensor systems for measuring contact surface normal forces using inductive coupling between a plurality of coils and a conductive target. The following will now describe these sensors and systems in more detail with reference to the drawings and where like numbers refer to like structures.

The embodiments depicted in FIGS. 1A-1F and the corresponding description relate to structural elements of the flexible tactile sensors. FIGS. 2A-2B provide an understanding for the electrical and magnetic principles enabling the functionality of the flexible tactile sensors described herein. An illustrative block diagram of the flexible tactile sensor system will then be discussed with reference to FIG. 3. Example conductive target and coil positions are then discussed with reference to FIGS. 4A-1 through 4D-2. Finally, a computer-generated visualization of the conductive target is depicted and described with reference to FIG. 5.

Figure 1A:
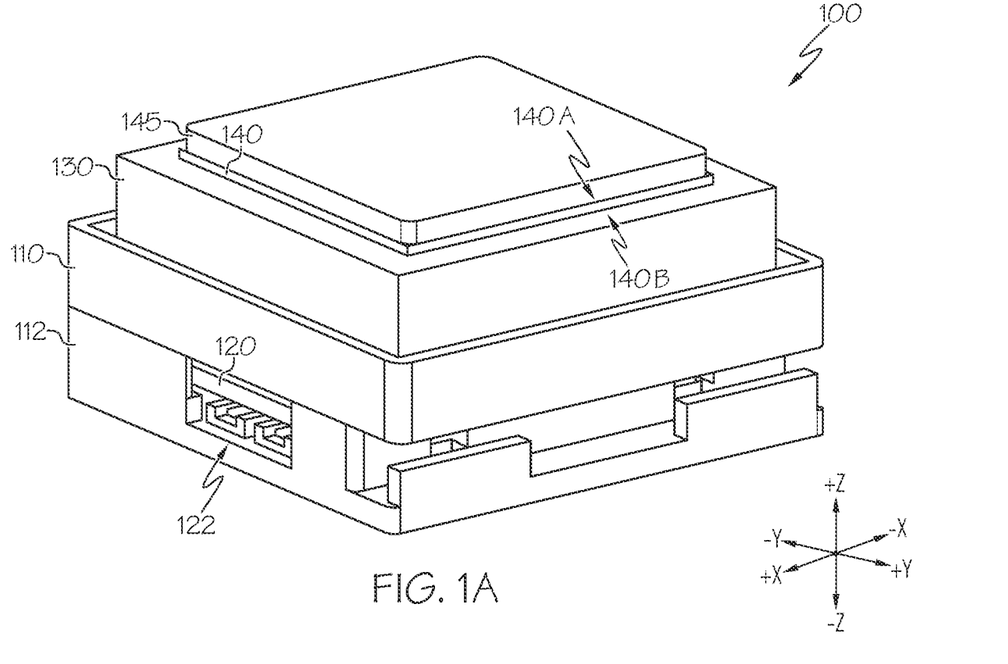
FIG. 1A schematically depicts a perspective view of an illustrative flexible tactile sensor according to one or more embodiments shown and described herein.

Turning to FIG. 1A, a perspective view of an illustrative flexible tactile sensor 100 according to one or more embodiments is depicted. It should be understood that embodiments are not limited by the shape and configuration of the example flexible tactile sensor 100 shown in FIG. 1A. Some embodiments of the flexible tactile sensor 100 include a housing having an upper structure 110 coupled to a lower structure 112 forming a cavity therebetween. A print circuit board (PCB) 120 is positioned within the cavity of the housing. The PCB 120, as described in more detail herein, may include a plurality of coils 125 and/or other electronic components for enabling the sensing functionality of the flexible tactile sensor 100. The flexible tactile sensor 100 further includes a pliable material 130 coupled directly to the plurality of coils 125 or to the upper structure 110 of the housing including the PCB 120. The pliable material 130 may be any material that is capable of elastically deforming under an applied force. That is, the pliable material 130 may temporarily deform and then return to an initial form when applied contact forces are removed. The pliable material 130 may be made up of one or more materials or may be a mechanical structure having members that are capable of flexing, folding, bending or the like under a contact force then returning to an initial state without permanent deformation. An example mechanical structure type of pliable material 130 is depicted and described herein with reference to FIG. 1E.

Still referring to FIG. 1A, the pliable material 130 is further coupled to a conductive target 140. The conductive target 140 is a metal plate or similar material that is spaced apart from the plurality of coils 125 by the pliable material 130. The conductive target 140 may be a metal plate or composite material having a conductive layer that interacts with the magnetic fields generated by the plurality of coils 125. The conductive target has a thickness that is greater than the skin depth of the electric field created in response to the electromagnetic field generated by the plurality of coils 125. This is to ensure that the sensors are responding to the conductive target 140 and the electromagnetic field is not effectively going through the conductive target 140 and responding to conductive items beyond the conductive target 140.

The conductive target 140 has a first surface 140A and a second surface 140B. In embodiments, the surface area of at least the second surface 140B of the conductive target 140 which is oriented to face the plurality of coils 125 has a surface area that is greater than at least one of the plurality of coils 125 and when in a non-contact position extends over one or more of the plurality of coils 125. The second surface 140B is coupled to the pliable material 130. The pliable material 130 enables the conductive target 140 to move with respect to the plurality of coils 125 in response to contact forces applied thereto. For example, the pliable material 130 may compress, twist, translate, or otherwise cause the conductive target 140 to move in response to applied contact forces.

In some embodiments, the conductive target 140 includes a compliant material 145. The compliant material 145 may be coupled to and/or formed over a portion of the conductive target 140. The compliant material 145 may be generally applied to the surface of the conductive target 140 that is opposite the surface coupled to the pliable material 130. The compliant material 145 may be a neoprene, rubber-like, latex, or similar material that assists in providing a friction surface for shear forces or other non-perpendicular forces applied to the surface of the conductive target 140. In some embodiments, the compliant material 145 may extend over the surface of the conductive target 140 and the pliable material 130 thereby coupling to the housing (e.g., the upper structure 110) to constrain the conductive target 140 and the pliable material 10 in the X-Y directions. This configuration may also be used to pre-compress the pliable material 130.

It should be understood that the compliant material 145 is not provided in some embodiments.

The housing may further include openings 122 in either or both the upper structure 110 and/or the lower structure. The openings 122 may provide access to connections between flexible tactile sensor 100 modules and/or computing devices 300. The connections may be electrical and/or mechanical. Electrical connections may be facilitated by electrical terminal disposed on the PCB 120 within the housing and wiring harnesses and mating connectors extending through the openings. Mechanical connections may be implemented to connect multiple flexible tactile sensor 100 modules together in a row, a column, or an array. In other embodiments, no openings are provided.

The lower structure 112 of the housing includes the PCB 120 and other electronic components. In some embodiments, a ferrite material (not shown) may be positioned between the PCB 120 and the lower structure 112. The ferrite material may be in the form of a sheet and configured to constrain the electromagnetic field created by the plurality of coils 125 disposed in or on the PCB 120. This concentrates the magnetic flux and redirects it toward the conductive target 140, which may also increase the range of the sensor. In some embodiments, a ferrite material may be applied to the first surface 140A of the conductive target 140. The application of a ferrite material on the first surface 140A of the conductive target 140 may further help prevent the plurality of coils 125 from sensing beyond the conductive target 140. This may be beneficial when objects that the flexible tactile sensor 100 is interfacing with are large metallic objects such as pots and pans.

Figure 1B:
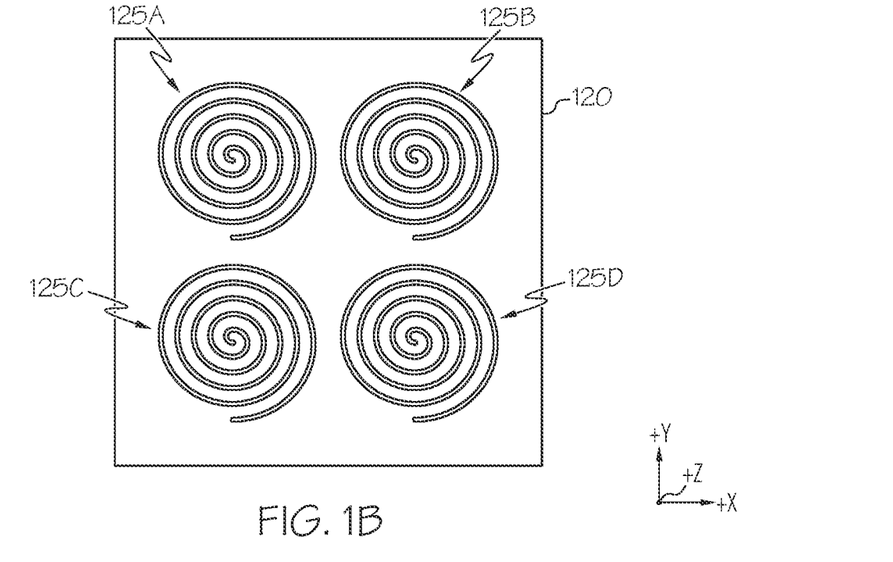
FIG. 1B schematically depicts a top-down view of an illustrative coil arrangement for a flexible tactile sensor according to one or more embodiments shown and described herein.

Turning to FIG. 1B, a top-down view of an illustrative coil arrangement for a flexible tactile sensor is depicted. Coil arrangements of the present disclosure include at least three coils arranged in a planar array configuration with each other. FIG. 1B depicts a PCB 120 that includes four coils 125A, 125B, 125C, and 125D. The coils 125A-125D (collectively referenced as coils 125) may be configured on or within the PCB 120. That is, the coils 125 may be formed on the surface of the PCB 120 as a layer of the PCB 120 or the coils may be formed and/or embedded with the PCB 120. The coils are planar coils having a predetermined number of turns. Configurations of three or more coils 125 enable rich sensing having multiple points of measurement. That is, compound rotations about the X and Y-axes enable the sensor to measure the normal force vector.

Figure 1C:
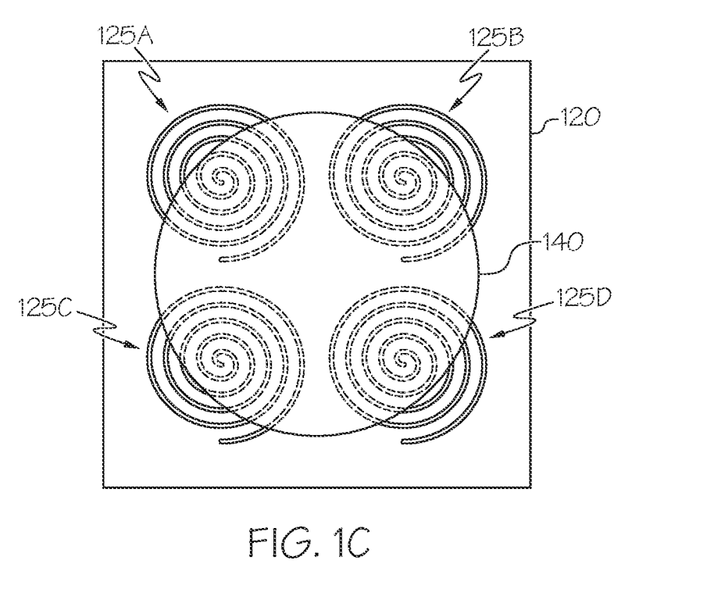
FIG. 1C schematically depicts a top-down view of an illustrative coil arrangement on a printed circuit board and positioned below a conductive target of a flexible tactile sensor according to one or more embodiments shown and described herein.
Figure 1D:
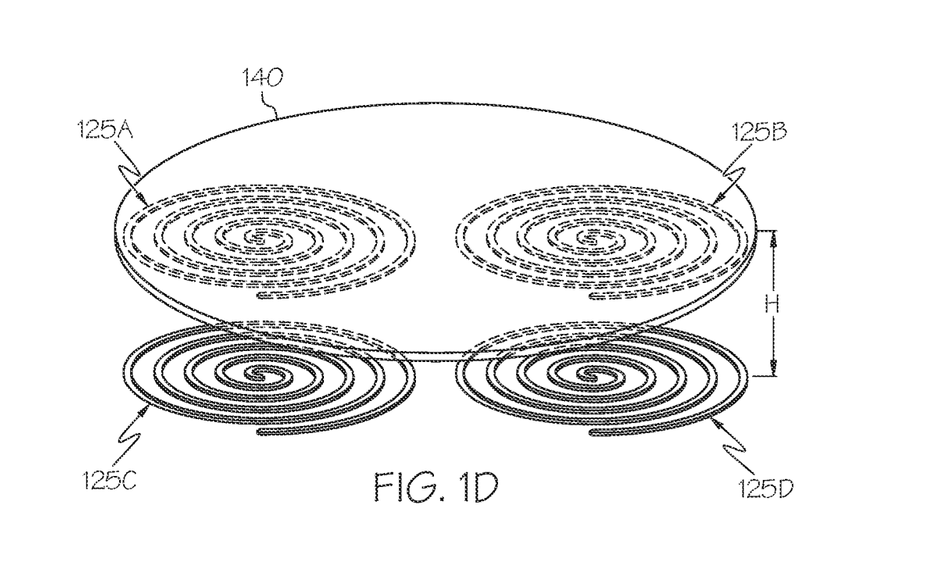
FIG. 1D schematically depicts a perspective side view of an illustrative coil arrangement positioned below a conductive target of a flexible tactile sensor according to one or more embodiments shown and described herein.

Turning to FIG. 1C, the top-down view of the flexible tactile sensor depicted in FIG. 1B now shows the conductive target 140. The conductive target 140 as described herein, is positioned, for example, in vertical alignment with the plurality of coils 125 such that a portion of the conductive target 140 vertically aligns with the plurality of coils 125. The flexible tactile sensor depicted in FIG. 1C is in a contactless state. Additionally, the conductive target 140 is depicted as a circular disc. However, in other embodiments, the conductive target 140 may have other shapes such as a triangular plate or a square plate. The shape of the conductive target 140 may be selected in conjunction with the arrangement of the array of three or more coils 125. FIG. 1D depicts a perspective side view of the illustrative coils 125 and conductive target 140 depicted in FIG. 1C. Here, FIG. 1D shows that the conductive target 140 is spaced apart from the coils 125 by a height H. The spacing between the conductive target 140 and the coils 125 may be occupied by the pliable material 130, which enables the conductive target 140 to move with respect to the coils 125. As described in more detail herein, as the respective height between the conductive target 140 and select coils 125 changes the inductance of the coils changes, which may be sensed and used to determine the change in position of the conductive target 140.

Figure 1E:
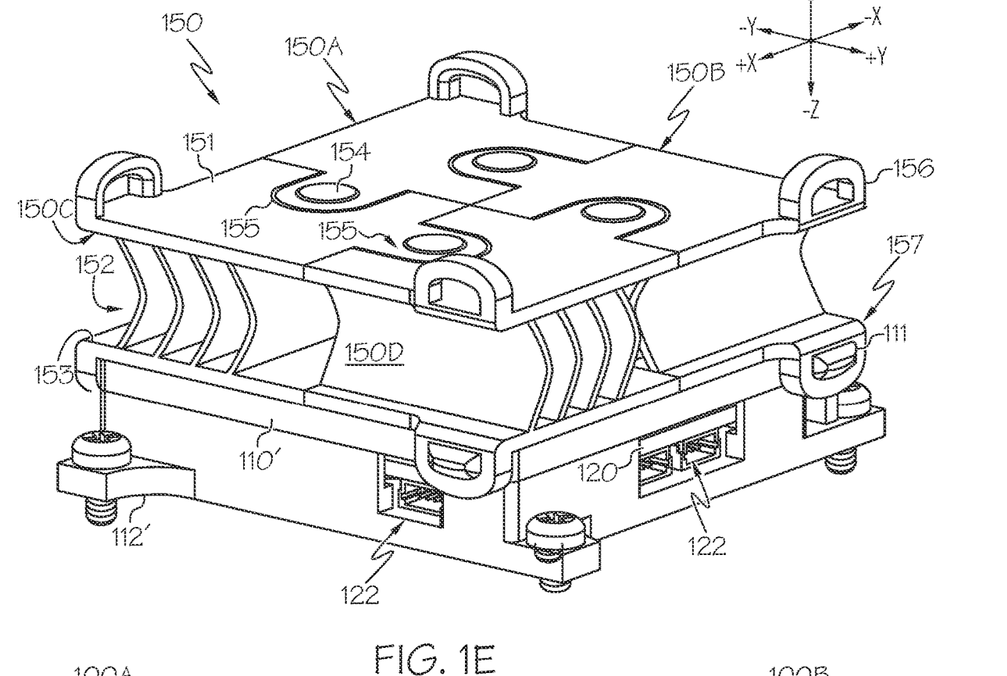
FIG. 1E schematically depicts a perspective view of an illustrative flexible tactile sensor having a modular flexible layer according to one or more embodiments shown and described herein.
Figure 2A:
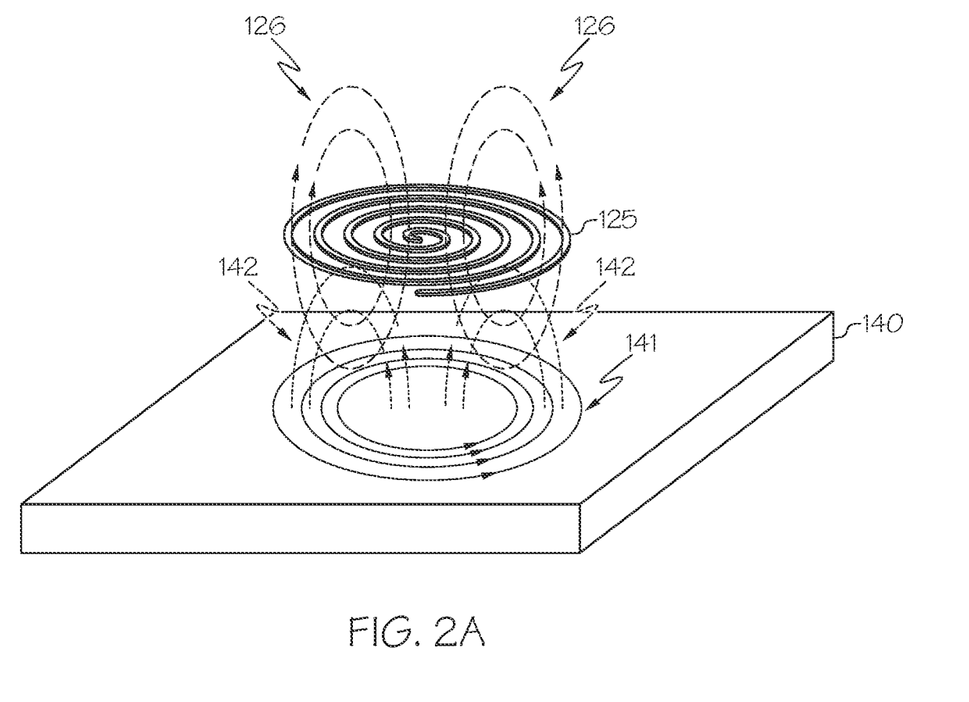
FIG. 2A schematically depicts an illustrative diagram of a magnetic field of a coil interacting with a conductive target according to one or more embodiments shown and described herein.
Figure 2B:
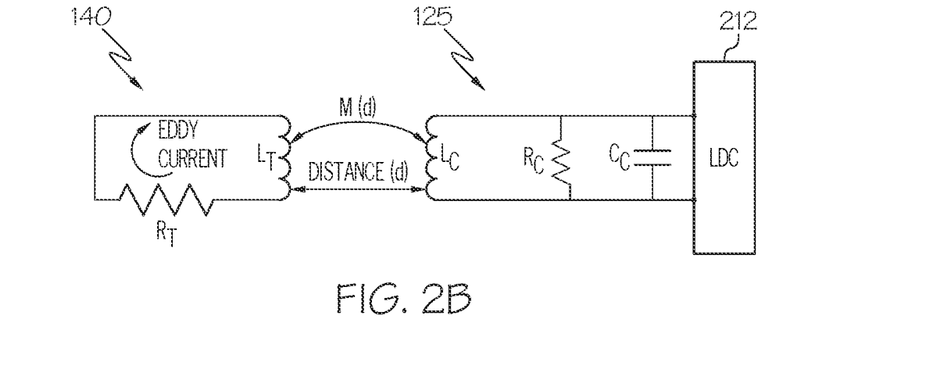
FIG. 2B schematically depicts an illustrative circuit representation of a sensor coil and conductive target according to one or more embodiments shown and described herein.

Turning to FIG. 1E, a perspective view of an illustrative flexible tactile sensor 100. In particular, the embodiment depicted in FIG. 1E includes a non-limiting example of a modular flexible layer 150 forming a mechanical structure type of pliable material 130. For example, the pliable material 130 may be a 3D-printed, molded, machined, or otherwise formed structure. The modular flexible layer 150 functioning as the pliable material 130 portion of the flexible tactile sensor 100 may comprise a plurality of interlocking segments 150A, 150B, 150C, and 150D that can independently flex thereby enabling the modular flexible layer 150 to support the conductive target 140 (not shown in FIG. 1E) and respond to forces applied to the conductive target 140. For example, each of the plurality of interlocking segments 150A, 150B, 150C, and 150D includes a first surface 151 opposite a second surface 153. The first surface 151 and the second surface 153 are interconnected by a plurality of flexible members 152. The plurality of flexible members 152 may be configured to bend, flex, or fold when stressed and return to a relaxed positioned when the source of stresses are removed. For example, the plurality of flexible members 152 may be rib shaped structures extending from the first surface 151 to the second surface 153. However, embodiments are not limited to rib shaped structures. Furthermore, each of the plurality of interlocking segments 150A, 150B, 150C, and 150D includes a first interlocking feature 155 configured to receive a second interlocking feature 154. For example, the first interlocking feature 155 may be a flange having a receptacle for receiving the second interlocking feature 154. The first interlocking feature 155 and second interlocking feature 154 are positioned on different edges of each of the plurality of interlocking segments 150A, 150B, 150C, and 150D so that one interlocking segment 150A may be connected to another interlocking segment 150B.

Each of the plurality of interlocking segments 150A, 150B, 150C, and 150D further include a third interlocking feature 156 extending vertically (+Z-axis direction) from the first surface 151 of each of the plurality of interlocking segments 150A, 150B, 150C, and 150D. The third interlocking features 156 are configured to mate with a corresponding feature on the conductive target 140 thereby coupling the modular flexible layer 150 with the conductive target 140. Similarly, each of the plurality of interlocking segments 150A, 150B, 150C, and 150D further include a fourth interlocking feature 157 extending vertically (−Z-axis direction) from the second surface 153 of each of the plurality of interlocking segments 150A, 150B, 150C, and 150D. The fourth interlocking features 157 are configured to mate with a corresponding feature on the upper housing structure 110' thereby coupling the modular flexible layer 150 with the upper housing structure 110'. The upper housing structure 110' couples to a lower housing structure 112' which function similar to the upper and lower structures 110 and 112 depicted and described with reference to FIG. 1A.

Figure 1F:
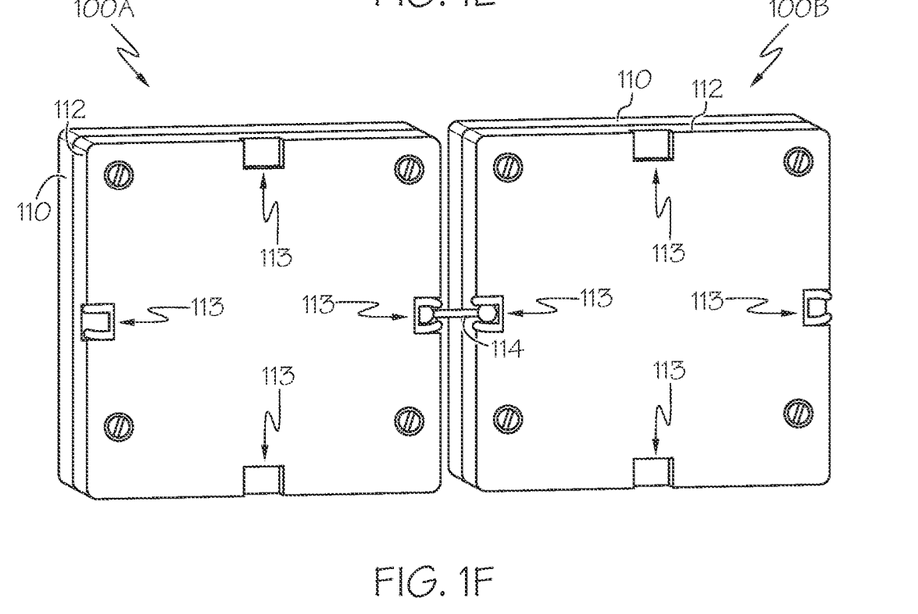
FIG. 1F schematically depicts a bottom perspective view of a connecting means for coupling two or more flexible tactile sensor modules according to one or more embodiments shown and described herein.

Referring to FIG. 1F, a bottom perspective view of a connecting means for coupling two or more flexible tactile sensor modules 100A and 100B together is depicted. For example, in some embodiments the lower structure 112 may include receiving cavities 113 formed along the edges of the bottom surface of the lower structure 112. A receiving cavity 113 of a first flexible tactile sensor module 100A may be configured to receive a first end of a connecting member 114. Another receiving cavity 113 of a second flexible tactile sensor module 100B may be configured to receive a second end of the connecting member 114. The connecting member 114 may couple to the receiving cavities 113 through an interference or friction type connection. However, the coupling of two or more flexible tactile sensor modules 100A and 100B may not be limited to the specific embodiment described herein. Two or more flexible tactile sensor modules 100A and 100B may be fastened to each other through any known fastening means resulting in a rigid or flexible connection between the two or more flexible tactile sensor modules 100A and 100B.

Referring now to FIG. 2A an illustrative diagram of a magnetic field of a coil 125 interacting with a conductive target 140 is depicted. When current (e.g., alternating current AC) flows through the coil 125 an AC magnetic field 126 is induced. The magnetic field 126 will induce eddy currents 141 in nearby conductors such as a conductive target 140.

The eddy currents 141 are a function of the distance, size, and composition of the conductor. The eddy currents 141 generate their own magnetic field 142, which opposes the original field 126 generated by the coil 125 (also referred to as the sensor inductor). By opposing the original field 126, the original field 126 is weakened. This produces a reduction in inductance compared to the inductor's free space inductance. The interactions between these structures are phenomena known as inductive coupling. That is, the eddy currents 141 induced on the conductive target 140 flow in such a way that they weaken the magnetic field 126 of the source coil 125 according to Lenz's Law. As the conductive target 140 moves closer to the coil 125 the eddy currents 141 increase, and the magnetic field 126 of the source coil 125 weakens further. When the inductance of the system is reduced, the resonant frequency of the coil 125 increases.

FIG. 2B depicts an illustrative equivalent circuit diagram corresponding to FIG. 2A. An EM field, M(d), appropriate for sensing can be generated using an L-C resonator. One topology for an L-C tank is shown in FIG. 2B. To simplify the inductor amplitude calculations, a parallel electrical model may be used. For inductive sensing applications, the resistive element $R_C$ represents parasitic circuit losses and is not a discrete component. Any shift in the conductive target 140 position causes the inductance value, $L_C$, to change, which in turn causes the resonant frequency to change. Hence, measuring the frequency change can be used to determine the inductance change, and therefore is based on the conductive target 140 position. In addition, by monitoring the amount of energy injected into the LC circuit, the $R_T$ can be measured. Various LDC devices (e.g., the electronic device 212) use one or both of these two principles to determine the change in position (distance D) of the conductive target 140, depending on the specific device.

Figure 3:
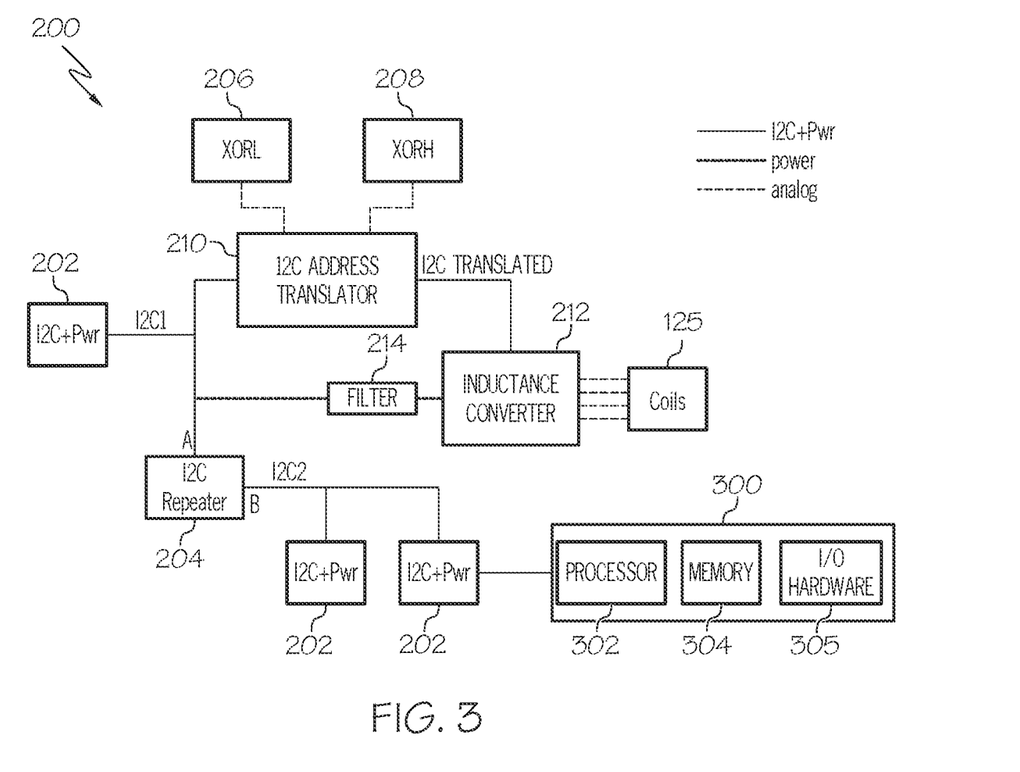
FIG. 3 depicts an illustrative block diagram of a flexible tactile sensor according to one or more embodiments shown and described herein.

FIG. 3 depicts an illustrative block diagram of a flexible tactile sensor 100 module that is communicatively coupled to a computing device 300. The flexible tactile sensor 100 module includes several electrical components connected to the plurality of coils 125. Each flexible tactile sensor 100 module includes an inductance to digital converter, LDC device 212 that communicates, for example, via I2C. The LDC device 212 receives power and provides an alternating current source of power to the coils 125. The power provided to the LDC device 212 may be passed through a filter 214 to reduce noise in the power signal and/or isolate the frequency range of alternating current to be provided to the coils 125. In some embodiments, the frequency of the alternating current power signal may be a predefined value between about 500 kHz to about 30 MHz. The LDC device 212 is configured to sample each coil at a predefined sampling rate to monitor changes in the inductance of the coil. The sampling rate may be about 4 kSPS (thousands of samples per second) to about 180 kSPS. This sampling may be multiplexed between two or more LDC devices 212 depending on the number of coils 125 implemented with the flexible tactile sensor 100 module.

The flexible tactile sensor 100 modules may have an additional device that allows for the configuration of a unique address for the LDC device 212. The addressing device 210 may include one or more sets of selector switches 206 and 208 for configuring a unique I2C address for the specific flexible tactile sensor 100 module. This is optional if there is only one flexible tactile sensor 100 module in the system or if there are other means to configure a unique address for the LDC device 212 within the flexible tactile sensor 100 module. In some embodiments, the flexible tactile sensor 100 module also includes an I2C repeater 204 on each module. This is optional if the I2C bus is not run over long distances or has low parasitic losses such that the signal repeater is not warranted. Additionally, the flexible tactile sensor 100 module includes one or more I2C plus power interfaces 202. The I2C plus power interfaces 202 are used to communicatively couple one flexible tactile sensor 100 module to another and/or communicatively couple one or more flexible tactile sensor 100 modules to a computing device 300.

The computing device 300 includes a processor 302, a memory component 304, and input/output hardware 305. The input/output hardware 305 may include one or more various components for facilitating the input of information from a human or another electronic device and/or the output of information to a network, an electronic device, a sensor, a display or the like. The various components of the computing device 300 and the interaction with the electronics of the flexible tactile sensor 100 will be described in detail below. It is understood that other embodiments of the system 200 may include additional components.

The components of the computing device 300 and the flexible tactile sensor 100 modules may be interconnected via communication paths. The communication paths may be formed from any medium that is capable of transmitting a signal such as, for example, conductive wires, conductive traces, optical waveguides, or the like. Moreover, the communication paths may be formed from a combination of mediums capable of transmitting signals. In one embodiment, the communication paths comprise a combination of conductive traces, conductive wires, connectors, and buses that cooperate to permit the transmission of electrical data signals to components such as processors, memories, sensors, input devices, output devices, and communication devices. Accordingly, the communication paths may comprise a bus. Additionally, it is noted that the term "signal" means a waveform (e.g., electrical, optical, magnetic, mechanical or electromagnetic), such as DC, AC, sinusoidal-wave, triangular-wave, square-wave, vibration, and the like, capable of traveling through a medium. The communication path 320 communicatively couples the various components of the system 200. As used herein, the term "communicatively coupled" means that coupled components are capable of exchanging data signals with one another such as, for example, electrical signals via conductive medium, electromagnetic signals via air, optical signals via optical waveguides, and the like.

The computing device 300 may be any device or combination of components comprising a processor 302 and the memory component 304. The processor 302 of the computing device 300 may be any device capable of executing the machine-readable instruction set stored in the memory component 304. Accordingly, the processor 302 may be an electric controller, an integrated circuit, a microchip, a field programmable gate array, a computer, or any other computing device. The processor 302 is communicatively coupled to the other components of the system 200 by the communication paths. Accordingly, the communication paths may communicatively couple any number of processors 302 with one another, and allow the components coupled to the communication paths to operate in a distributed computing environment. Specifically, each of the components may operate as a node that may send and/or receive data. While the embodiment depicted in FIG. 3 includes a single processor 302, other embodiments may include more than one processor 302.

The memory component 304 of the computing device 300 is coupled to the processor 302. The memory component 304 may be a non-transitory computer readable memory and may comprise RAM, ROM, flash memories, hard drives, or any non-transitory memory device capable of storing machine-readable instructions such that the machine-readable instructions can be accessed and executed by the processor 302. The machine-readable instruction set may comprise logic or algorithm(s) written in any programming language of any generation (e.g., 1GL, 2GL, 3GL, 4GL, or 5GL) such as machine language that may be directly executed by the processor 302, or assembly language, object-oriented programming (OOP), scripting languages, microcode, etc., that may be compiled or assembled into machine readable instructions and stored in the memory component 304. Alternatively, the machine-readable instruction set may be written in a hardware description language (HDL), such as logic implemented via either a field-programmable gate array (FPGA) configuration or an application-specific integrated circuit (ASIC), or their equivalents. Accordingly, the functionality described herein may be implemented in any conventional computer programming language, as pre-programmed hardware elements, or as a combination of hardware and software components. While the computing device 300 depicted in FIG. 3 includes a single memory component 304, other embodiments may include more than one memory components 304.

Still referring to FIG. 3, the input/output hardware 305 may include a display device, an input device, network interface hardware, and/or the like. A display device provides a visual output, for example, a visualization of the orientation of the conductive target 140 to a user. The display device may include any medium capable of transmitting an optical output such as, for example, a cathode ray tube, light emitting diodes, a liquid crystal display, a plasma display, or the like. Additionally, the display device may be the display of a portable personal device such as a smart phone, tablet, laptop or other electronic device.

In some embodiments, the input/output hardware 305 includes one or more input devices that are coupled to the communication path and communicatively coupled to the processor 302. The input device may be any device capable of transforming user contact into a data signal that can be transmitted over the communication path such as, for example, a keyboard, a button, a switch, a knob, a microphone or the like. In various embodiments, an input device may be flexible tactile sensor 100 as described herein. In some embodiments, the input device includes a power button, a volume button, an activation button, a scroll button, or the like. The one or more input devices may be provided so that the user may interact with the computing device 300, such as to navigate menus, make selections, set preferences, and other functionality described herein. In some embodiments, the input device includes a pressure sensor, a touch-sensitive region, a pressure strip, or the like. It should be understood that some embodiments may not include the input device.

Additionally, the input/output hardware 305 may include network interface hardware. The network interface hardware may be any device capable of transmitting and/or receiving data via a network. Accordingly, network interface hardware can include a wireless communication module configured as a communication transceiver for sending and/or receiving any wired or wireless communication. For example, the network interface hardware may include an antenna, a modem, LAN port, Wi-Fi card, WiMax card, mobile communications hardware, near-field communication hardware, satellite communication hardware and/or any wired or wireless hardware for communicating with other networks and/or devices. In one embodiment, network interface hardware includes hardware configured to operate in accordance with the Bluetooth wireless communication protocol. In another embodiment, network interface hardware may include a Bluetooth send/receive module for sending and receiving Bluetooth communications to/from a portable electronic device. In some embodiments, the flexible tactile sensor 100 modules may be wirelessly communicatively coupled to the computing device 300.

In some embodiments, the system 200 may be communicatively coupled to a network. The network may include one or more computer networks (e.g., a personal area network, a local area network, or a wide area network), cellular networks, satellite networks and/or a global positioning system and combinations thereof. Accordingly, the system 200 can be communicatively coupled to the network via wires, via a wide area network, via a local area network, via a personal area network, via a cellular network, via a satellite network, or the like. Suitable local area networks may include wired Ethernet and/or wireless technologies such as, for example, wireless fidelity (Wi-Fi). Suitable personal area networks may include wireless technologies such as, for example, IrDA, Bluetooth, Wireless USB, Z-Wave, ZigBee, and/or other near field communication protocols. Suitable personal area networks may similarly include wired computer buses such as, for example, USB and FireWire. Suitable cellular networks include, but are not limited to, technologies such as LTE, WiMAX, UMTS, CDMA, and GSM.

Referring now to FIGS. 4A-1 thru 4C-2 illustrative examples of conductive target 440 orientations with respect to the plurality of coils 425 are depicted. Each of the figure pairs (e.g., FIGS. 4A-1 and 4A-2, FIGS. 4B-1 and 4B-2, FIGS. 4C-1 and 4C-2, FIGS. 4D-1 and 4D-2) depict a top-down and side perspective view of example orientations of the conductive target 440 in response to a contact force applied thereto.

Figure 4A:
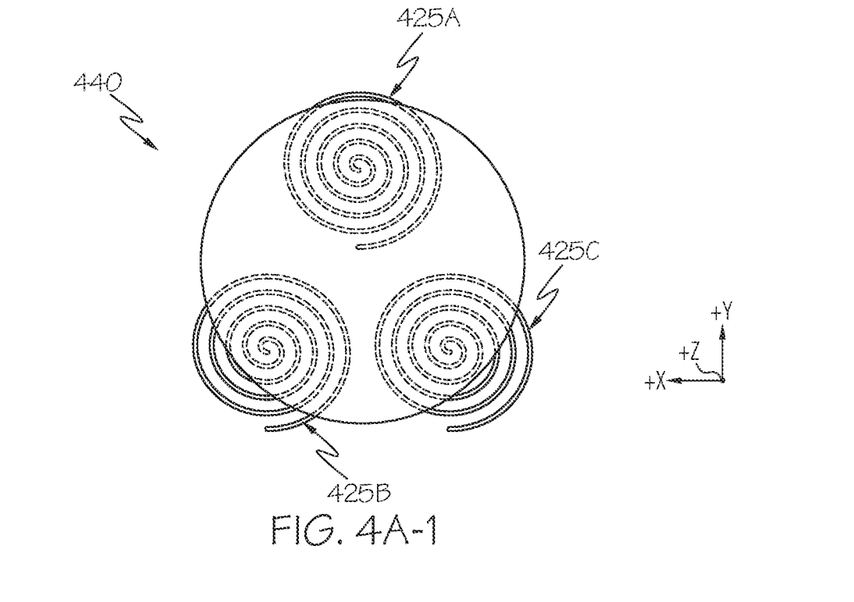
Figure 4A:
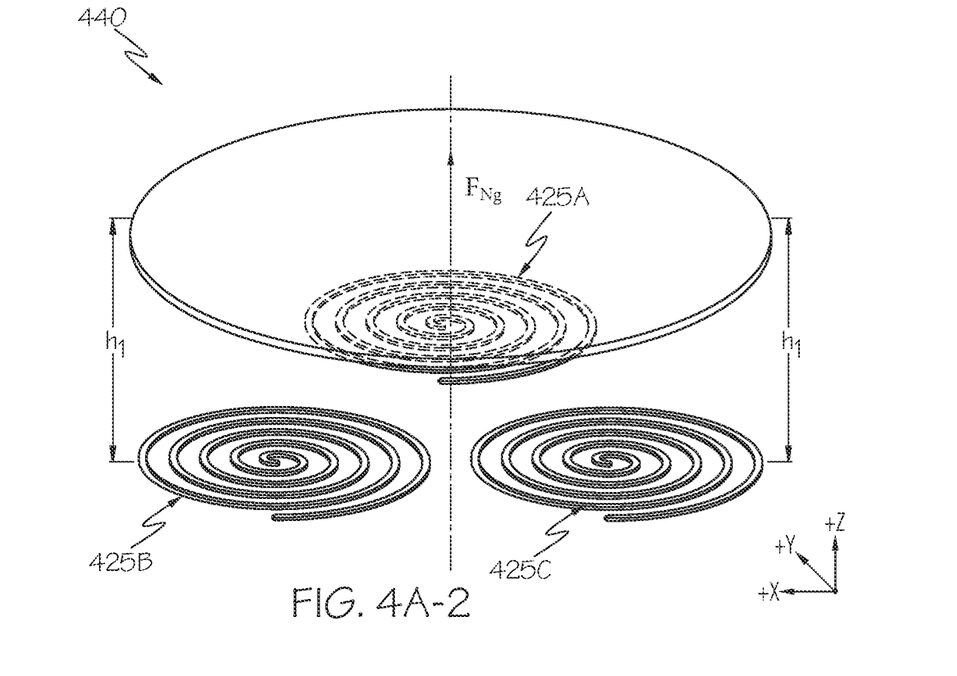

Referring to FIGS. 4A-1 and 4A-2, FIG. 4A-1 schematically depicts an illustrative top-down view of a coil arrangement having a plurality of coils 425 positioned at a first height h1 below a conductive target 440 and FIG. 4A-2 depicts the same in a side perspective view. When no contact forces are applied to the conductive target 440, a predetermined distance, the first height h1, separates the conductive target 440 from the plurality of coils 425. Here, each coil 425A, 425B, and 425C are measured to determine an initial inductance value in response to no forces being applied to the conductive target 440. Here, the only force $F_{Ng}$ affecting the conductive target 440 may be a force due to gravity.

Figure 4B:
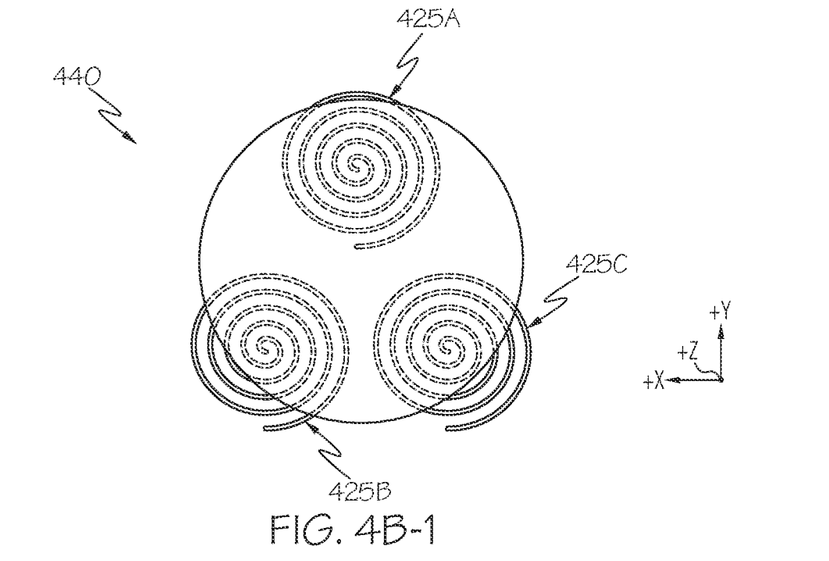
Figure 4B:
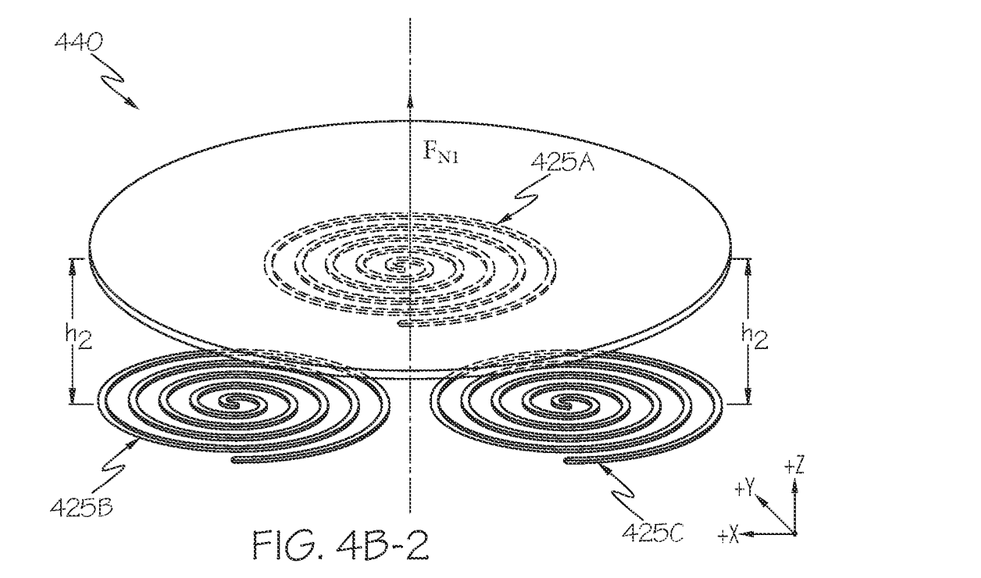

Turning to FIGS. 4B-1 and 4B-2 a top down and side perspective view of a conductive target 440 under a compressive force in the Z-axis direction is depicted. When the conductive target 440 receives a compressive force the pliable material 130 (FIG. 1A) is compressed decreasing the distance (height h2) the conductive target 440 is spaced apart from the plurality of coils 425. This results in a change in the inductance of each of the coils from the initial inductance value. The LDC device 212 communicates the new inductance values for each coil 425 to the computing device 300. When the change in inductance of each coil is the same or nearly the same, then the computing device 300 may determine the is a compressive force along the Z-axis and thereby determine the force normal $F_{N1}$ is aligned with the Z-axis but has increased in magnitude based on the amount of change from the initial inductance value when the conductive target 440 was at a first height h1 from the plurality of coils 425. In some embodiments, the computing device 300 may generate a visualization of the conductive target 440 and display the visualization a display device.

Figure 4C:
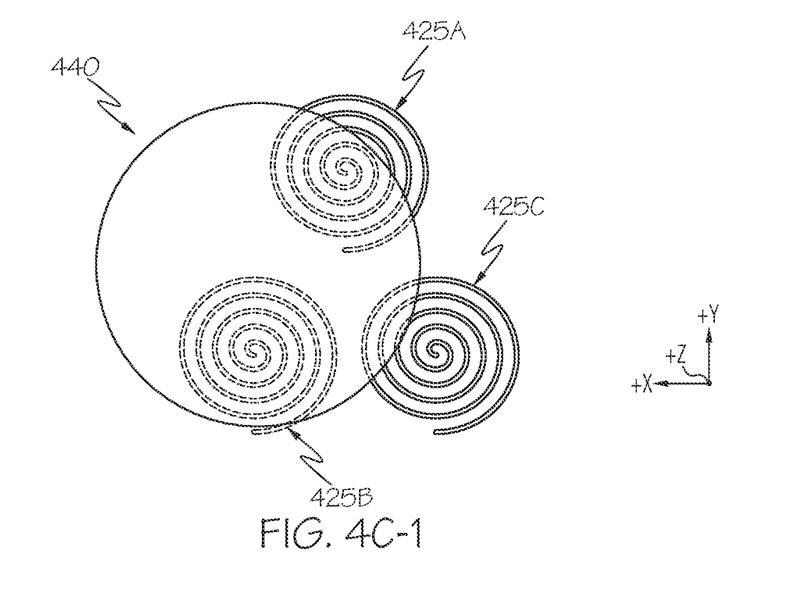
Figure 4C:
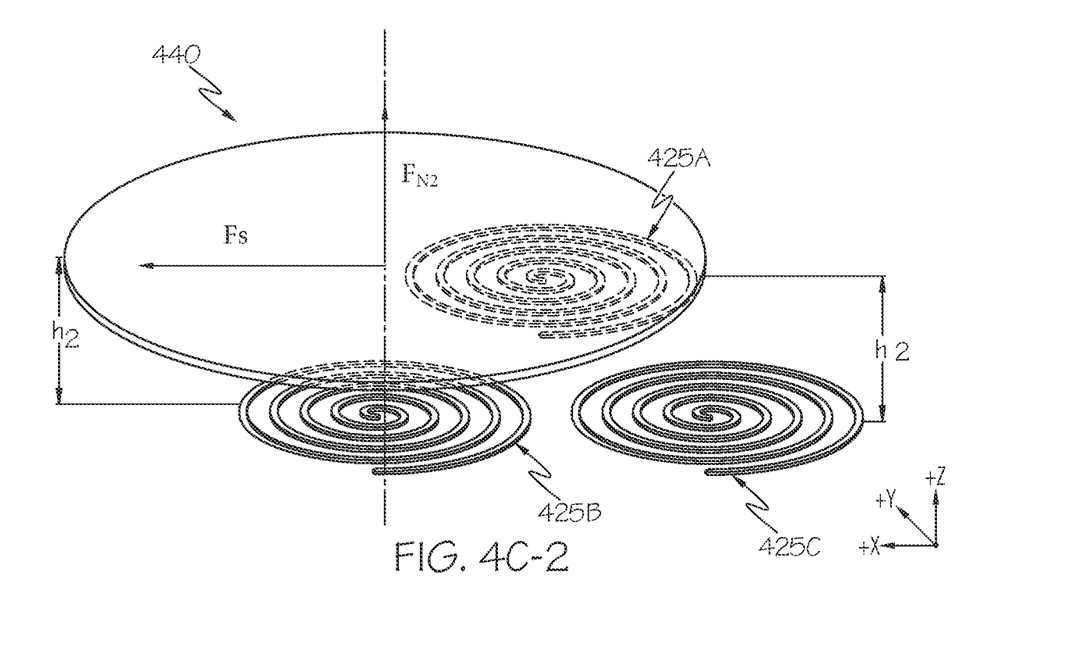

Turning to FIGS. 4C-1 and 4C-2 a top down and side perspective view of a conductive target 440 under a compressive force along the Z-axis and a shear force along the X-axis is depicted. When the conductive target 440 receives a compressive force and shear force the pliable material 130 (FIG. 1A) is compressed decreasing the distance (height h2) the conductive target 440 is spaced apart from the plurality of coils 425. The pliable material 130 may also deform laterally in response to the shear force, but constrain the conductive target 440 within a range of the plurality of coils 425. This results in unequal changes in the inductance of each of the coils 425 from their initial inductance values. The LDC device 212 communicates the new inductance values for each coil 425 to the computing device 300. In response to receiving the changed inductance values for each of the coils 425, the computing device 300 determines how the conductive target 440 has moved with respect to the plurality of coils and computes the new force normal $F_{N2}$ and in this case a shear force vector $F_S$. As depicted in FIGS. 4C-1 and 4C-2, the conductive target 440 is no longer vertically aligned with the third coil 425C, but is more completely aligned with the second coil 425B. That is the amount the conductive target 440 that is vertically aligned with a coil affects the inductance of a coil 425. Accordingly, changes in the inductance of each of the coils 425 can be computed into a change in the position and orientation of the conductive target 440.

Figure 4D:
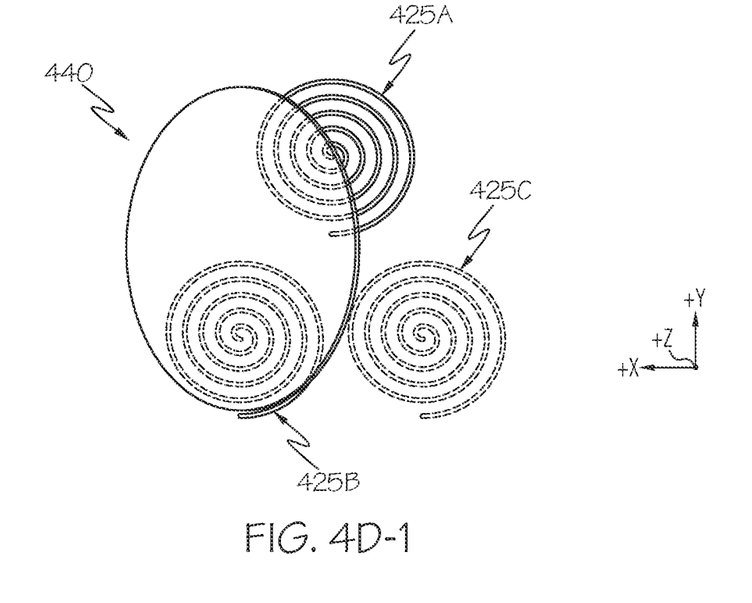
Figure 4D:
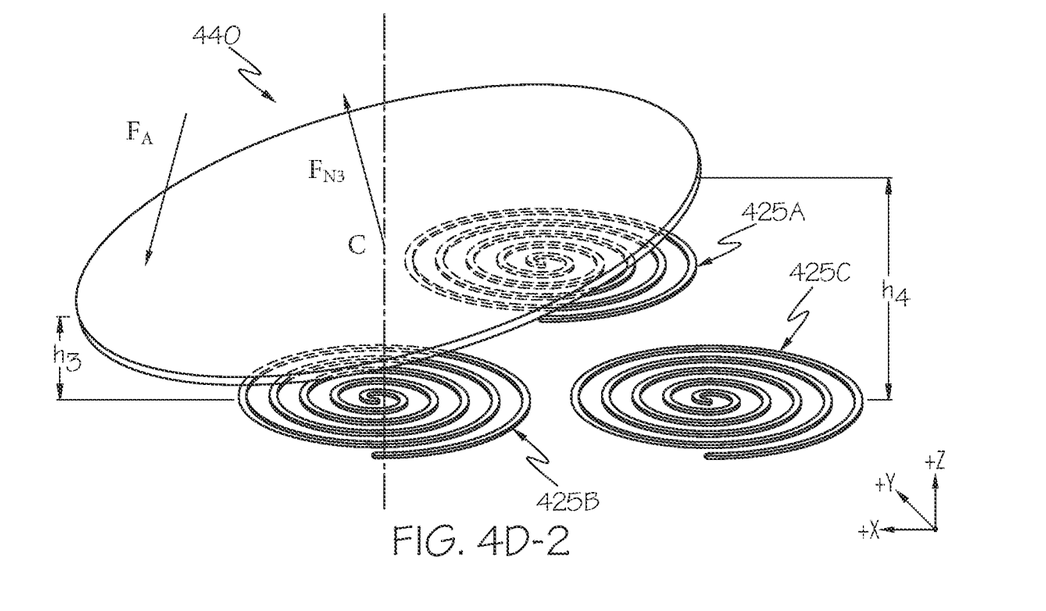

Turning to FIGS. 4D-1 and 4D-2 a top down and side perspective view of a conductive target 440 under an applied force $F_A$ that has a compressive force along the Z-axis that is not centered on the conductive target 440 and a shear force along the X-axis is depicted. When the conductive target 440 receives a compressive force away from the center C of the conductive target and shear force the pliable material 130 (FIG. 1A) is compressed decreasing the distance (height h2) the conductive target 440 is spaced apart from the plurality of coils 425. The pliable material 130 may also deform laterally in response to the shear force, but constrain the conductive target 440 within a range of the plurality of coils 425. This results in unequal changes in the inductance of each of the coils 425 from their initial inductance values. The LDC device 212 communicates the new inductance values for each coil 425 to the computing device 300. In response to receiving the changed inductance values for each of the coils 425, the computing device 300 determines how the conductive target 440 has moved with respect to the plurality of coils and computes the new force normal $F_{N3}$. As depicted in FIGS. 4D-1 and 4D-2, the conductive target 440 is vertically aligned with the second coil 425B, but at a height h3 that is less than the initial height h1. Additionally, the conductive target 440 is vertically aligned with the third coil 425C, but at a height h4 that is greater than the initial height h1. Accordingly, the amount the conductive target 440 that is vertically aligned with each coil 425 and the distance (height h3 and h4) between each coil 425 and the conductive target 440 with a coil affects the inductance of the coils 425. Accordingly, changes in the inductance of each of the coils 425 can be computed by the computing device 300 into a change in the position and orientation of the conductive target 440.

It should be understood that FIGS. 4A-1 through 4D-2 illustrate only a few example orientations that may result from a contact force being applied to the conductive target 440. In each instance, the LDC device 212 monitors and transmits changes in the inductance of each of the plurality of coils 425 in the array to the computing device 300. The computing device 300, based on the changes in inductance and the calibrated characteristics of the pliable material 130 calculates a new force normal (e.g., a force direction and magnitude) for the conductive target 440.

The calculations of the new force normal are possible because the conductive target 440 has a larger surface area than the plurality of coils 425 and is positioned at a predetermined distance above the plurality of coils 425. As described above, when the conductive target is tilted about its centroid, for example, as depicted in FIGS. 4D-1 and 4D-2, the conductive area above second coil 425B gets closer to sensing coil 425B and further from the third coil 425C. This causes the inductance of the second coil 425B to decrease and the inductance of the third coil 425C to increase.

The distance of the conductive target 440 changes monotonically with applied force. The goal of the pliable material is to keep the target from significantly translating on the X-Y plane, while allowing compression in the Z-axis direction to be a proxy for measuring the force information (through the monotonic relationship with displacement). When creating a richer sensor with multiple points of measurement (3 or more), the compound rotations about the X and Y-axes are what allows the flexible tactile sensor 100 to measure the normal force vector.

Figure 5:
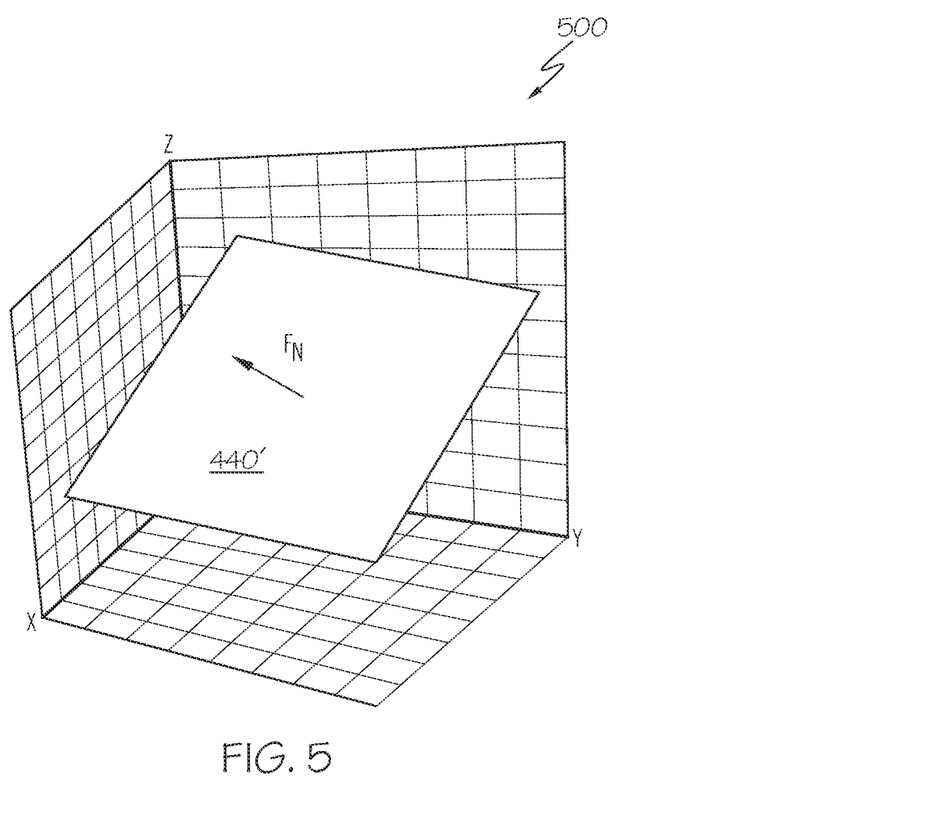
FIG. 5 depicts an illustrative visualizer interface displaying a representative orientation and position of the conductive target surface as sensed by the coils in response to contact with the conductive target surface according to one or more embodiments shown and described herein.

Referring to FIG. 5, an illustrative visualizer interface 500 displaying a representative orientation and position of the conductive target surface 440' as sensed by the coils 425 in response to an applied force on the conductive target 440 is depicted. In some embodiments, the computing device 300 may generate a visual representation of the orientation and position of the conductive target surface 440'. The visual representation may be displayed on a display device for diagnostic analysis or control of a robot system by a user. The X-Y plane corresponds to the plane having the plurality of coils 425. As such, the visual representation is depicted with reference to a known plane within the flexible tactile sensor 100.

It should now be understood that embodiments of the present disclosure are directed to flexible tactile sensors for measuring contact surface normal force using inductive coupling. The flexible tactile sensor includes a conductive target positioned in a first plane, at least three coils forming an array within a second plane, the second plane spaced apart from the first plane, a pliable material coupling the conductive target to the at least three coils, and an electronic device electrically coupled to each of the at least three coils, the electronic device configured to induce an AC signal within each of the at least three coils and measure a change in inductance in the at least three coils in response to movement of the conductive target.

It is noted that recitations herein of a component of the present disclosure being "configured" or "programmed" in a particular way, to embody a particular property, or to function in a particular manner, are structural recitations, as opposed to recitations of intended use. More specifically, the references herein to the manner in which a component is "configured" or "programmed" denotes an existing physical condition of the component and, as such, is to be taken as a definite recitation of the structural characteristics of the component.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

It is noted that the terms "substantially" and "about" and "approximately" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A flexible tactile sensor, comprising:
a non-ferrous conductive target positioned in a first plane;
at least three coils forming an array within a second plane, the second plane spaced apart from the first plane;
a pliable material coupling the non-ferrous conductive target to the at least three coils; and
an electronic device electrically coupled to each of the at least three coils, the electronic device configured to induce an AC signal within each of the at least three coils and measure a change in inductance in the at least three coils in response to movement of the non-ferrous conductive target.

2. The flexible tactile sensor of claim 1, further comprising a housing having an upper structure and a lower structure coupled to the upper structure, wherein a cavity is formed between the upper structure and the lower structure, the cavity is configured to receive the at least three coils and the pliable material is coupled to the upper structure of the housing.

3. The flexible tactile sensor of claim 2, wherein the lower structure of the housing includes one or more connection features configured to receive a connector to couple one flexible tactile sensor to another flexible tactile sensor.

4. The flexible tactile sensor of claim 1, wherein three of the at least three coils form a triangular array within the first second plane.

5. The flexible tactile sensor of claim 1, further comprising a printed circuit board (PCB), wherein the at least three coils are embedded within the PCB and the electronic device is supported on the PCB.

6. The flexible tactile sensor of claim 1, wherein the non-ferrous conductive target is a metal plate having a first surface and a second surface, the second surface coupled to the pliable material.

7. The flexible tactile sensor of claim 6, wherein a surface area of the second surface of the non-ferrous conductive target is greater than a surface area of one of the at least three coils.

8. The flexible tactile sensor of claim 6, further comprising a compliant material coupled to the first surface of the non-ferrous conductive target.

9. The flexible tactile sensor of claim 1, wherein the pliable material is foam material.

10. The flexible tactile sensor of claim 1, wherein the pliable material is a flexible structure comprising a first surface opposite and spaced apart from a second surface and a plurality of flexible ribs coupling the first surface to the second surface, wherein the plurality of flexible ribs are configured to fold in response to a contact force being applied to the non-ferrous conductive target.

11. A system, comprising
a computing device communicatively coupled to one or more flexible tactile sensors; and
a flexible tactile sensor comprising:
a non-ferrous conductive target positioned in a first plane;
at least three coils forming an array within a second plane, the second plane spaced apart from the first plane;
a pliable material coupling the non-ferrous conductive target to the at least three coils; and
an electronic device electrically coupled to each of the at least three coils, the electronic device configured to induce an AC signal within each of the at least three coils and measure a change in inductance in the at least three coils in response to movement of the non-ferrous conductive target, wherein the computing device is configured to:
receive one or more signals from the electronic device of at least one of the one or more flexible tactile sensors, the one or more signals corresponding to the measured changes in the inductance in the at least three coils, and
determine a magnitude and direction of a normal force of the non-ferrous conductive target.

12. The system of claim 11, wherein the computing device is further configured to determine a shear force applied to the non-ferrous conductive target based on the measured changes in the inductance in the at least three coils.

13. The system of claim 11, wherein the computing device is further configured to generate, on a display device, a graphical visualization of an orientation of the non-ferrous conductive target based on the normal force.

14. The system of claim 11, wherein the flexible tactile sensor further comprises a housing having an upper structure and a lower structure coupled to the upper structure, wherein a cavity is formed between the upper structure and the lower structure, the cavity is configured to receive the at least three coils and the pliable material is coupled to the upper structure of the housing.

15. The system of claim 14, wherein the lower structure of the housing includes one or more connection features configured to receive a connector to couple one flexible tactile sensor to another flexible tactile sensor.

16. The system of claim 11, wherein three of the at least three coils form a triangular array within the first second plane.

17. The system of claim 11, further comprising a printed circuit board (PCB), wherein the at least three coils are embedded within the PCB and the electronic device is supported on the PCB.

18. The system of claim 11, wherein the non-ferrous conductive target is a metal plate having a first surface and a second surface, the second surface coupled to the pliable material.

19. The system of claim 18, wherein a surface area of the second surface of the non-ferrous conductive target is greater than a surface area of one of the at least three coils.

20. The system of claim 18, wherein the flexible tactile sensor further comprises a compliant material coupled to the first surface of the non-ferrous conductive target.

* * * * *

UNITED STATES PATENT AND TRADEMARK OFFICE
CERTIFICATE OF CORRECTION

PATENT NO. : 12,000,749 B2  
APPLICATION NO. : 17/344354  
DATED : June 4, 2024  
INVENTOR(S) : Andrew M. Beaulieu and Kristopher Lopez Page 1 of 1

It is certified that error appears in the above-identified patent and that said Letters Patent is hereby corrected as shown below:

On the Title Page

Primary/assistant examiner name, delete "Octavia Davis-Hollington" and insert --Octavia L Davis-Hollington--, therefor.

In the Specification

In Column 14, Line(s) 37, delete "have been" and insert --has been--, therefor.

In the Claims

In Column 15, Line(s) 1, Claim 11, after comprising, insert --:--.

Signed and Sealed this  
Eighteenth Day of March, 2025

Coke Morgan Stewart  
*Acting Director of the United States Patent and Trademark Office*